(12) United States Patent
Dai

(10) Patent No.: US 8,684,025 B2
(45) Date of Patent: Apr. 1, 2014

(54) DUAL FAUCET STRUCTURE

(75) Inventor: Jianliang Dai, Xiamen (CN)

(73) Assignee: Xiamen Fxy Bathroom Products Co., Ltd., Xiamen, Fujian (CN)

( * ) Notice: Subject to any disclaimer, the term of this patent is extended or adjusted under 35 U.S.C. 154(b) by 0 days.

(21) Appl. No.: 13/487,242

(22) Filed: Jun. 3, 2012

(65) Prior Publication Data
US 2013/0181440 A1    Jul. 18, 2013

(30) Foreign Application Priority Data

Jan. 17, 2012 (CN) .......................... 2012 2 0020539

(51) Int. Cl.
*E03C 1/048* (2006.01)
*E03C 1/05* (2006.01)
*F16K 11/20* (2006.01)

(52) U.S. Cl.
USPC ........... 137/315.12; 137/603; 137/801; 4/678

(58) Field of Classification Search
USPC .................. 137/603, 801, 315.12, 606; 4/678
See application file for complete search history.

(56) References Cited

U.S. PATENT DOCUMENTS

| 4,126,338 A | * | 11/1978 | Coel et al. | ...................... 285/330 |
| 2010/0096034 A1 | * | 4/2010 | Hou | .............................. 137/801 |
| 2011/0174403 A1 | * | 7/2011 | Lin | ................................ 137/602 |
| 2012/0056351 A1 | * | 3/2012 | Xu | ................................ 264/277 |

* cited by examiner

*Primary Examiner* — Craig Schneider
*Assistant Examiner* — Atif Chaudry

(57) ABSTRACT

A dual faucet structure includes a main body and two metallic pipes integrally formed with a cold water pipe and a hot water pipe of the main body. The main body has a water outlet between the cold water pipe and the hot water pipe. Each of the two metallic pipes has axial protrusions or grooves around an inner wall thereof. The cold water pipe and the hot water pipe have mating grooves or protrusions on outer walls thereof by injection molding to connect with the two metallic pipes. The present invention uses the environment friendly material to form the main body which connects with the metallic pipes. The dual faucet structure of the present invention is cost-effective and provides stable water flow and is environment friendly and has larger torque.

4 Claims, 6 Drawing Sheets

DUAL FAUCET STRUCTURE

BACKGROUND OF THE INVENTION

1. Field of the Invention

The present invention relates to a dual faucet structure, and more particularly, to a dual faucet structure which can connect cold and hot water pipes simultaneously.

2. Description of the Prior Art

A dual faucet is used to connect cold and hot water pipes simultaneously. The existing dual faucet is made of plastic material or metallic copper pipe. When installed, two inlet pipes of the dual faucet are connected to the cold and hot water pipes. In order to seal the junction, a certain torque is required. When the faucet made of plastic material is threadedly connected to the water pipe, the threads may be worn and tripped because the torque is not enough to cause the seal problem. The faucet made of metallic copper pipe can overcome the shortcoming of torque, but the copper pipe contains Zinc and Lead. After a period of time, Zinc and Lead may be washed away along with the water flow to cause hidden dangers for drink water. Besides, the manufacture cost of the faucet made of copper is high.

Accordingly, the present invention intends to provide a dual faucet structure for improving the shortcomings mentioned above.

SUMMARY OF THE INVENTION

The primary object of the present invention is to provide a dual faucet structure which enhances the installation strength of the faucet and the water quality.

A further object of the present invention is to provide a dual faucet structure which provides stable water flow and has a better quality.

In order to achieve the aforesaid objects, the dual faucet structure comprises a main body and two metallic pipes integrally formed with a cold water pipe and a hot water pipe of the main body. The main body has a water outlet between the cold water pipe and the hot water pipe. Each of the two metallic pipes has axial protrusions or grooves around an inner wall thereof. The cold water pipe and the hot water pipe have mating grooves or protrusions on outer walls thereof by injection molding to connect with the two metallic pipes.

Preferably, each of the two metallic pipes has threads on an outer wall thereof for connecting with a water passage. The cold and hot water pipes of the main body have a length larger than that of the two metallic pipes to prevent water leakage from the junction.

Preferably, the main body is made by plastic injection molding. The main body has an H-like shape and comprises the cold water pipe, the hot water pipe and a transverse pipe connecting the cold water pipe and the hot water pipe. The transverse pipe has the water outlet.

Preferably, the transverse pipe comprises a transverse core pipe. The core pipe has an outlet corresponding in position to the water outlet of the transverse pipe. The core pipe has two enlarged portions at two ends thereof to communicate with the cold water pipe and the hot water pipe.

Preferably, the core pipe has a plurality of positioning protrusions on an outer wall thereof. The inner wall of the transverse pipe is formed with recesses. The outer wall of the transverse pipe is formed with protruding bits. A certain thickness is defined between the protruding bits and the positioning protrusions.

Preferably, the core pipe has a curved wall.

Preferably, each of the two metallic pipes has a positioning notch at a top end thereof. The positioning notch has an inclined vertical section.

Preferably, the cold water pipe and the hot water pipe have troughs disposed close to the enlarged portions of the core pipe to prevent the enlarged portions from glue injection.

Preferably, the outer walls of the junctions of the cold and hot water pipes and the transverse pipe are formed with reinforcing ribs.

Preferably, the two metallic pipes are made of copper.

Accordingly, the threads on the outer walls of the metallic pipes are connected with the cold water pipe and the hot water pipe tightly, not having wear and tear and stripped problems to enhance its installation. The axial protrusions or grooves on the inner walls of the metallic pipes facilitate connection of the cold and hot water pipes and the metallic pipes and enhance the anti-twist capability when the main body is threadedly connected to the water pipe. The cold water pipe and the hot water pipe are made of a plastic material so that the water won't get connect with the metallic pipes made of copper to prevent loss of Zinc. The product is environment friendly. Not all the faucet of the present invention is made of copper so it can lower the cost.

In addition, by the design of the two enlarged portions and the curved wall of the core pipe as well as the troughs of the cold water pipe and the hot water pipe, the water flow passing the core pipe is stable. Even if change of the water pressure, the present invention can ensure the water flow is stable for use.

Furthermore, the present invention combines the advantages of the plastic material, such as environment friendly heat resistance and pressure resistance and the advantages the metallic material, such as anti-twist. In addition, the transverse pipe wraps the core pipe to have an integral configuration. The entire dual faucet structure of the present invention has a better quality and a long service span.

In sum, the dual faucet structure of the present invention is cost-effective and provides stable water flow and is environment friendly and has larger torque.

DETAILED DESCRIPTION OF THE PREFERRED EMBODIMENTS

Embodiments of the present invention will now be described, by way of example only, with reference to the accompanying drawings.

As shown in FIG. 1 through FIG. 9, the dual faucet structure according to a preferred embodiment of the present invention comprises a main body 1 and two metallic pipes 2 integrally formed with two pipes of the main body 1.

Figure 3:
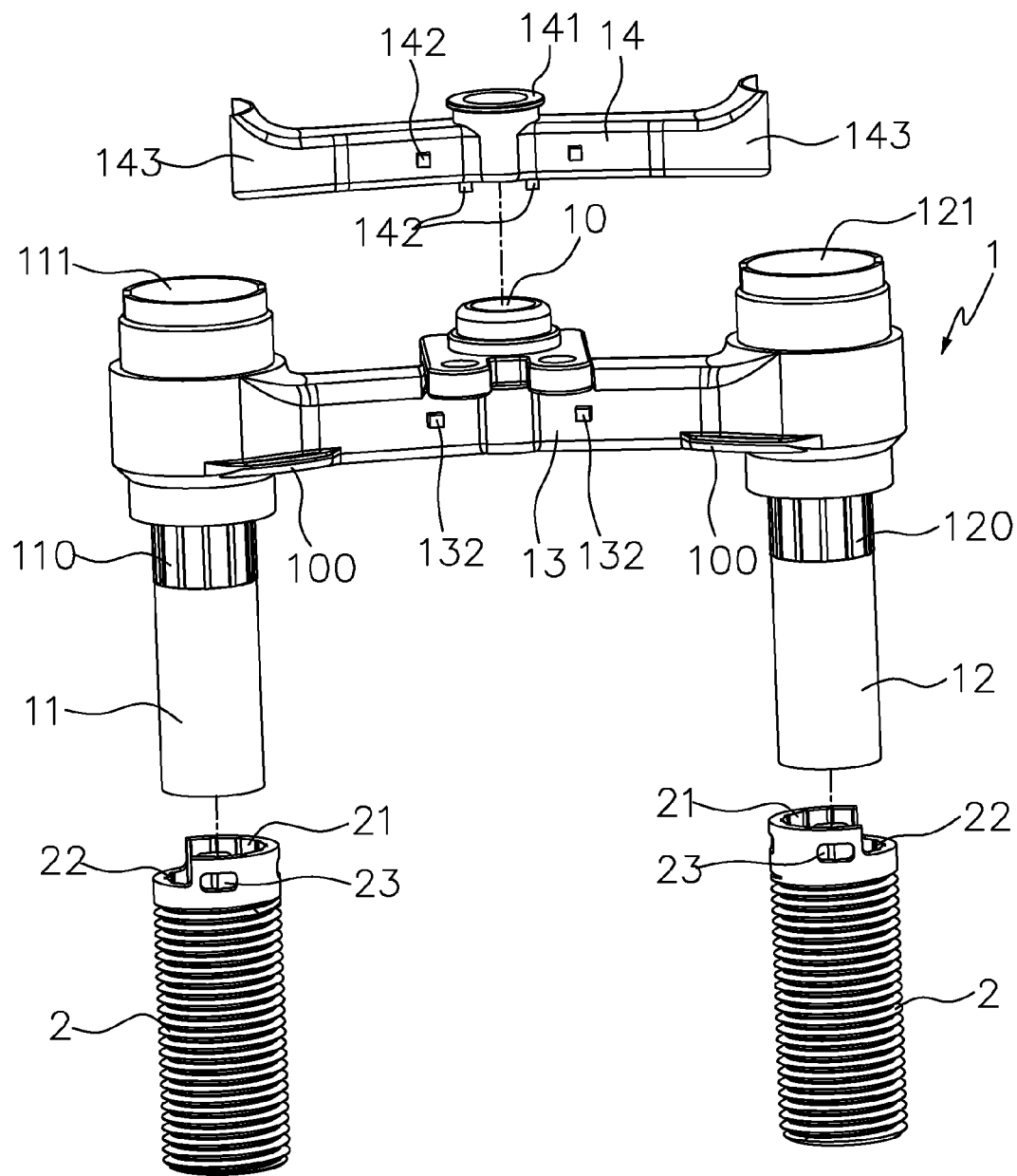
FIG. 3 is an exploded view according to the preferred embodiment of the present invention.

As shown in FIG. 3, the main body 1 is made by plastic injection molding. The main body 1 has an H-like shape, and comprises a cold water pipe 11, a hot water pipe 12 and a transverse pipe 13 connecting the cold water pipe 11 and the hot water pipe 12. The transverse pipe 13 has a water outlet 10.

Figure 4:
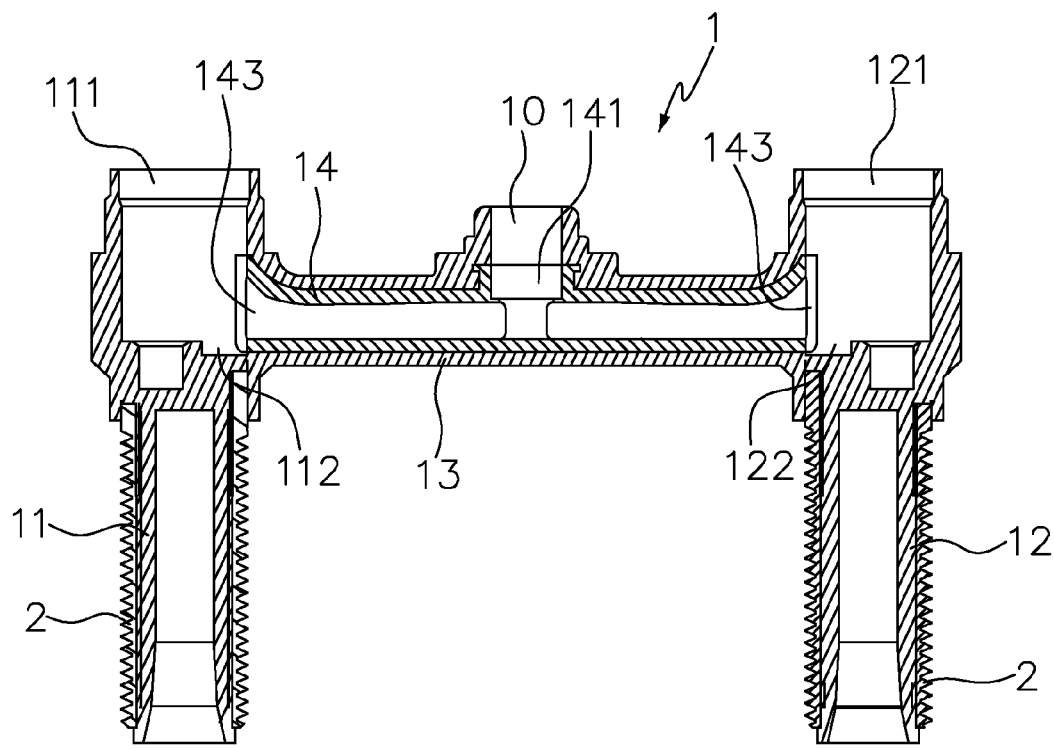
FIG. 4 is a vertical sectional view of FIG. 1.
Figure 5:
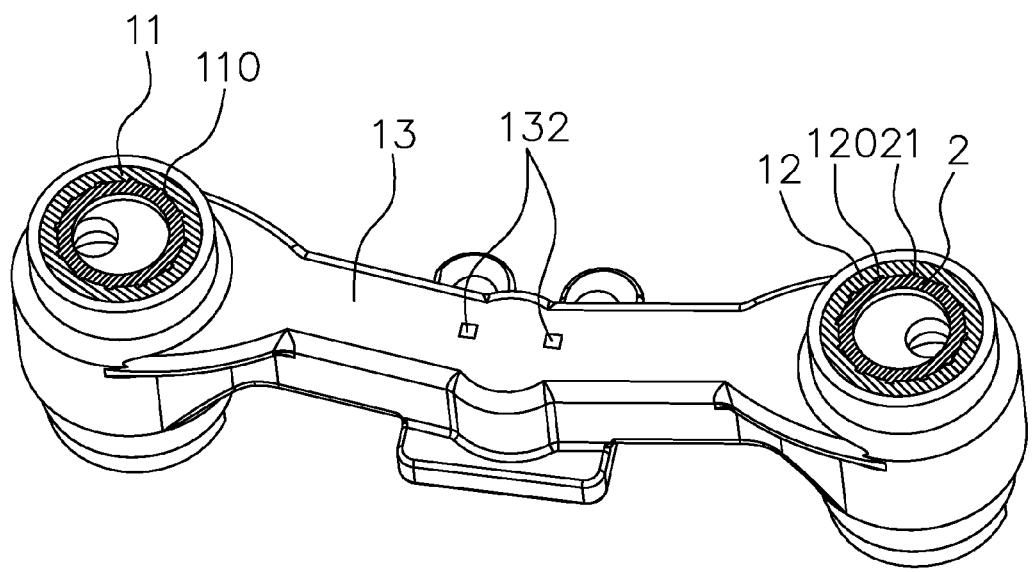
FIG. 5 is a transverse sectional view of FIG. 1.
Figure 6:
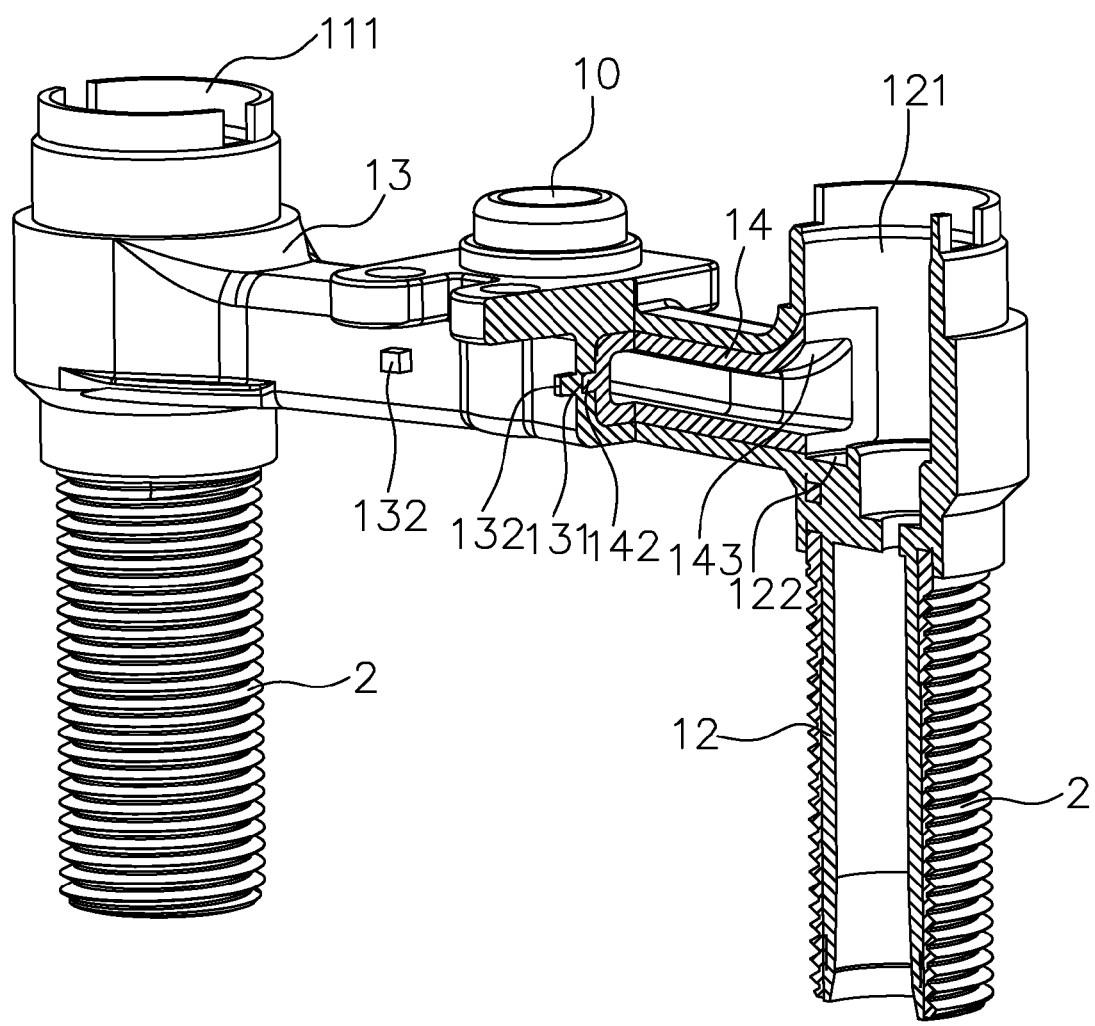
FIG. 6 is a partial sectional view of FIG. 1.

As shown in FIG. 4 and FIG. 6, the transverse pipe 13 comprises a transverse core pipe 14. The core pipe 14 has an outlet 141 corresponding in position to the water outlet 10 of the transverse pipe 13. The core pipe 14 has two enlarged portions 143 at two ends thereof to communicate with the cold water pipe 11 and the hot water pipe 12. Each of the two enlarged portions 143 has a trumpet-like shape to enhance the area that the cold and hot water pipes 11, 12 communicate with the core pipe 14. The two enlarged portions 143 are integrally formed with the core pipe 14 by injection molding, without a second process for reaming. This way can lower the manufacture cost and enhance work efficiency greatly.

Referring to FIG. 1 to FIG. 5, each metallic pipe 2 has threads on an outer wall thereof and axial protrusions 21 or grooves around an inner wall thereof. The cold water pipe 11 and the hot water pipe 12 have mating grooves 110, 120 or protrusions on outer walls thereof corresponding to the protrusions 21 or grooves of the metallic pipes 2 for connection of the cold and hot water pipes 11, 12 and the metallic pipes 2. Each of the two metallic pipes 2 has a positioning notch 22 and a positioning hole 23 at a top end thereof. The positioning notch 22 has an inclined vertical section. The two metallic pipes 2 are made of copper.

When molding the dual faucet structure of the present invention, the core pipe 14 and the two metallic pipes 2 are first placed in the mold of the main body 1, and then the transverse pipe 13 to overlay the core pipe 14, the cold water pipe 11 and the hot water pipe 12 to connect with the two metallic pipes 2 and valve seats 111, 121 on top of the cold and hot water pipes 11, 12 are formed by injection molding. Each of the two metallic pipes 2 has a length small than that of the cold water pipe 11 and the hot water pipe 12 to ensure connection of the transverse pipe 13 for preventing water leakage from the junction.

Referring to FIG. 6, for the precision location of the transverse pipe 13 by injection molding, the core pipe 14 has a plurality of positioning protrusions 142 on an outer wall thereof and the mold has mating movable blocks. Before injection molding, the positioning protrusions 142 of the core pipe 14 are secured to the movable blocks of the mold. When molding, the movable blocks are moved rearward for the positioning protrusions 142 to be covered by the plastic material so that the inner wall of the transverse pipe 13 is formed with recesses 131 and the outer wall of the transverse pipe 13 is formed with protruding bits 132. A certain thickness is defined between the protruding bits 132 and the positioning protrusions 142 of the core pipe 14 for the entirety of the transverse pipe 13, preventing water leakage between the core pipe 14 and the transverse pipe 13.

Figure 7:
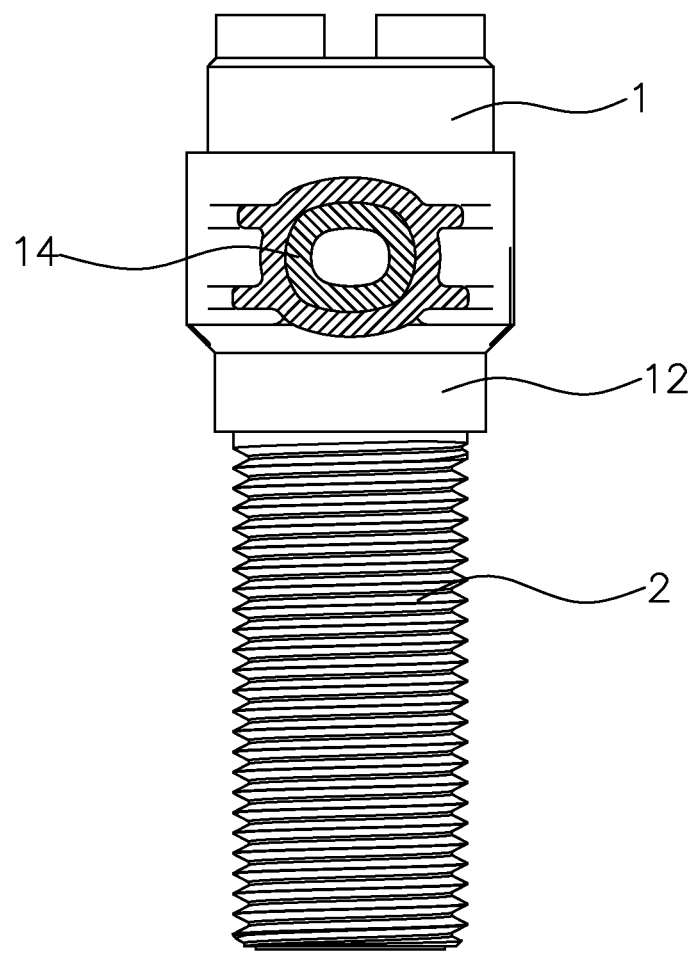
FIG. 7 is a cross-sectional view showing the transverse pipe and the core pipe of the present invention.

Referring to FIG. 7, the core pipe 14 is a plastic member and its rigidity is limited. The core pipe 14 is placed in the mold for molding the transverse pipe 13. In order to enhance the deformation ability of the core pipe 14 and to ensure the volume of the core pipe 14, the core pipe 14 has a curved wall which can prevent the core pipe 14 from being pressed flat to enhance its capability.

As shown in FIG. 6, the cold water pipe 11 and the hot water pipe 12 have troughs 112, 122 disposed close to the enlarged portions 143 of the core pipe 14. The troughs 112, 122 are formed by the protrusions on the mold when molding the cold water pipe 11 and the hot water pipe 12, which are used to prevent the plastic material from entering the enlarged portions 143 of the core pipe 14 to cause glue seal and glue injection when injection molding. This ensures the water volume passing the core pipe 14 and the size of the valve seats 111, 121 on top of the cold water pipe 11 and the hot water pipe 14 to enhance the efficiency and capability of the products.

Figure 1:
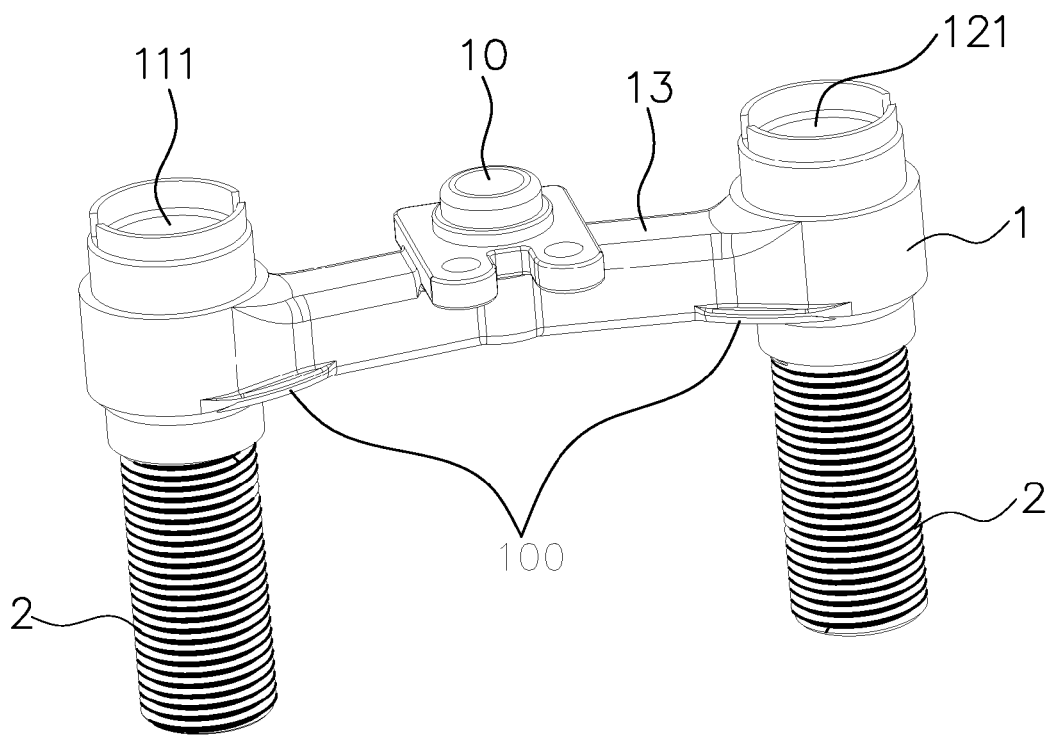
FIG. 1 is a perspective view according to a preferred embodiment of the present invention.
Figure 2:
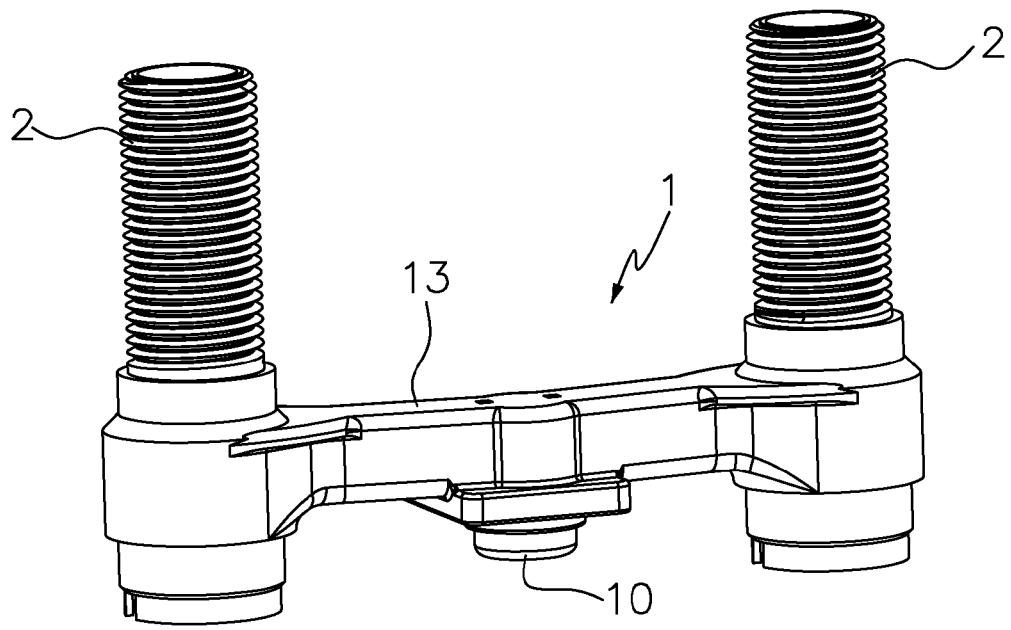
FIG. 2 is a top view according to the preferred embodiment of the present invention.

Referring to FIG. 1 to FIG. 3, the outer walls of the junctions of the cold and hot water pipes 11, 12 and the transverse pipe 13 are formed with reinforcing ribs 100 to enhance the anti-twist capability when the main body 1 is threadedly connected to a water pipe.

Figure 8:
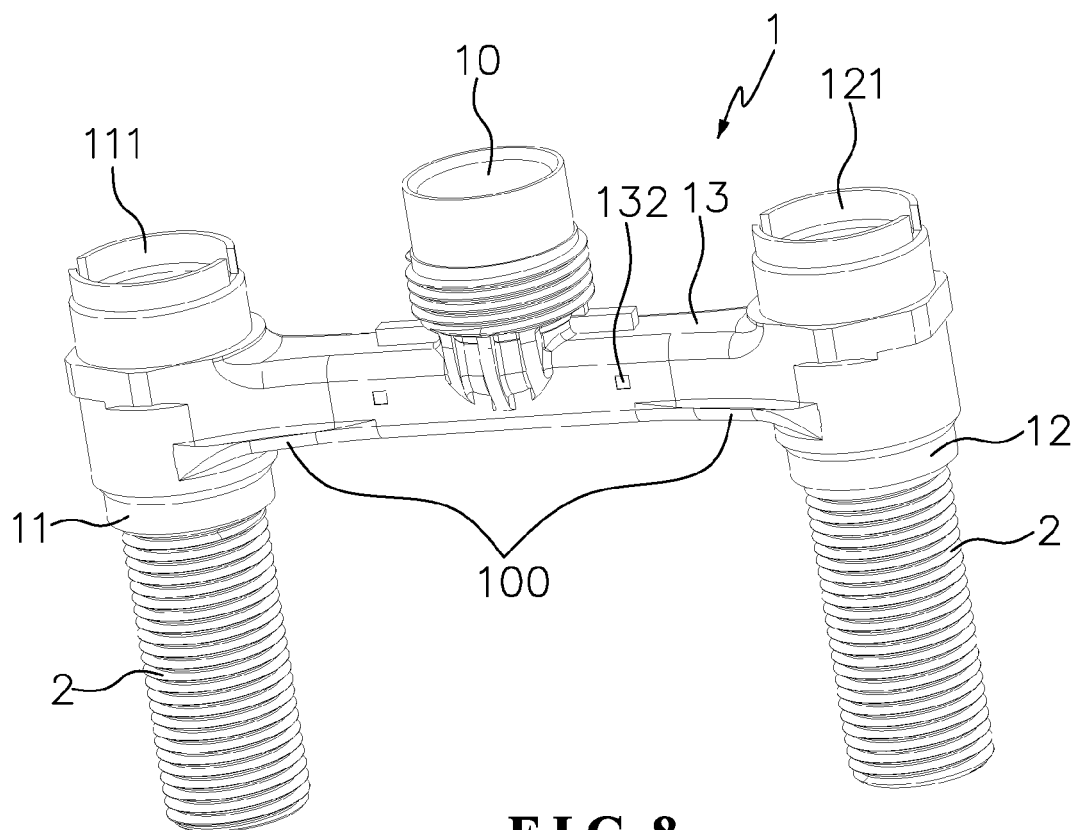
FIG. 8 is a perspective view of another configuration of the present invention.
Figure 9:
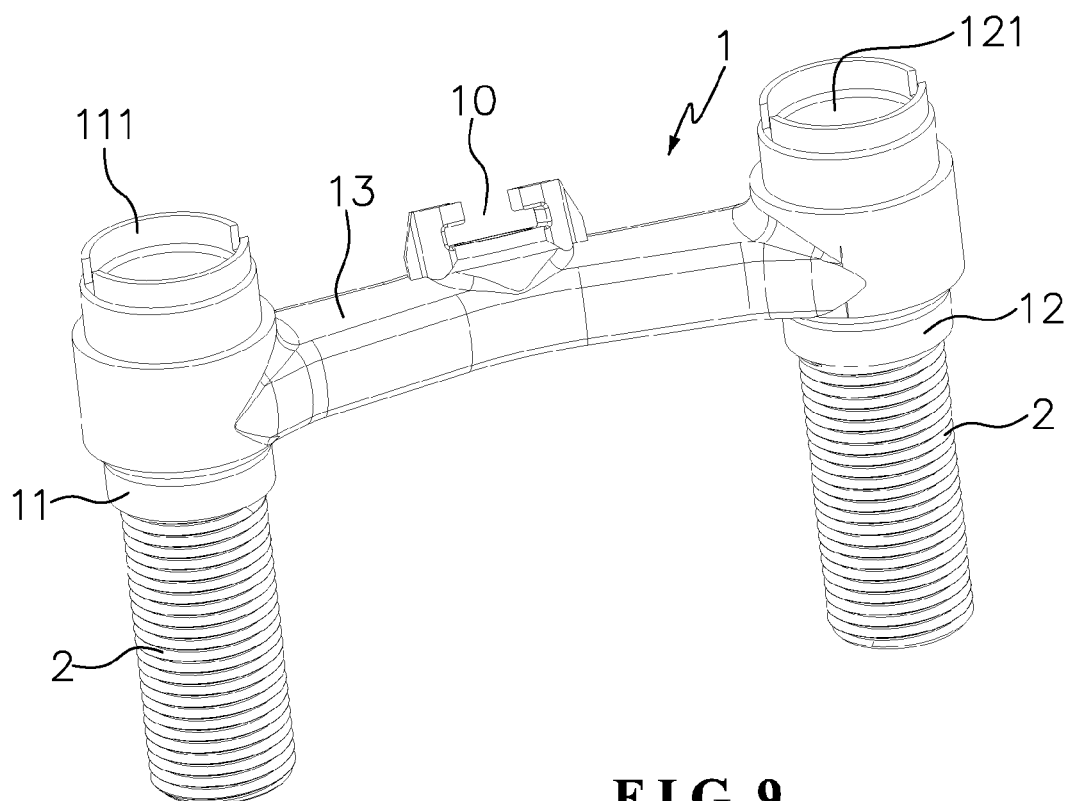
FIG. 9 is a perspective view of a further configuration of the present invention.

As shown in FIG. 8 and FIG. 9, the water outlet 10 of the transverse pipe 13 can be in a different shape as desired.

The dual faucet structure of the present invention has the following advantages.

1. The present invention has a stable installation. The threads on the outer walls of the metallic pipes 2 are connected with the cold water pipe 11 and the hot water pipe 12 tightly, not having wear and tear and stripped problems to enhance its installation. The axial protrusions or grooves on the inner walls of the metallic pipes 2 facilitate connection of the cold and hot water pipes 11, 12 and the metallic pipes 2 and enhance the anti-twist capability when the main body 1 is threadedly connected to the water pipe.

2. The present invention ensures the water quality. The cold water pipe 11 and the hot water pipe 12 are made of a plastic material so that the water won't get connect with the metallic pipes made of copper to prevent loss of Zinc. The product is environment friendly. Not all the faucet of the present invention is made of copper so it can lower the cost.

3. The present invention provides stable water flow. By the design of the two enlarged portions 143 and the curved wall of the core pipe 14 as well as the troughs 112, 122 of the cold water pipe 11 and the hot water pipe 12, the water flow passing the core pipe 14 is stable. Even if change of the water pressure, the present invention can ensure the water flow is stable for use.

4. The quality of the product of the present invention is better. The present invention combines the advantages of the plastic material, such as environment friendly heat resistance and pressure resistance and the advantages the metallic material, such as anti-twist. In addition, the transverse pipe 13 wraps the core pipe 14 to have an integral configuration. The entire dual faucet structure of the present invention has a better quality and a long service span.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A dual faucet structure, comprising a main body and two metallic pipes integrally formed with a cold water pipe and a hot water pipe of the main body, the main body having a water outlet between the cold water pipe and the hot water pipe, each of the two metallic pipes having axial protrusions or grooves around an inner wall thereof, the cold water pipe and the hot water pipe having mating grooves or protrusions on outer walls thereof by injection molding to connect with the two metallic pipes, wherein the main body is made by plastic injection molding, the main body having an H-like shape and comprising the cold water pipe, the hot water pipe and a transverse pipe connecting the cold water pipe and the hot water pipe, the transverse pipe having the water outlet, the transverse pipe comprises a transverse core pipe, the core pipe having an outlet corresponding in position to the water outlet of the transverse pipe, the core pipe having two enlarged portions at two ends thereof to communicate with the cold water pipe and the hot water pipe, the core pipe has a plurality of positioning protrusions on an outer wall thereof, an inner wall of the transverse pipe being formed with recesses, an outer wall of the transverse pipe being formed with protruding bits, and a certain thickness being defined between the protruding bits and the positioning protrusions.

2. The dual faucet structure as claimed in claim 1, wherein the core pipe has a curved wall.

3. A dual faucet structure, comprising a main body and two metallic pipes integrally formed with a cold water pipe and a hot water pipe of the main body, the main body having a water outlet between the cold water pipe and the hot water pipe, each of the two metallic pipes having axial protrusions or grooves around an inner wall thereof, the cold water pipe and the hot water pipe having mating grooves or protrusions on outer walls thereof by injection molding to connect with the two metallic pipes, wherein each of the two metallic pipes has threads on an outer wall thereof for connecting with a water passage, the cold and hot water pipes of the main body having a length larger than that of the two metallic pipes, the main body is made by plastic injection molding, the main body having an H-like shape and comprising the cold water pipe, the hot water pipe and a transverse pipe connecting the cold water pipe and the hot water pipe, the transverse pipe having the water outlet, the core pipe has a plurality of positioning protrusions on an outer wall thereof, an inner wall of the transverse pipe being formed with recesses, an outer wall of the transverse pipe being formed with protruding bits, and a certain thickness being defined between the protruding bits and the positioning protrusions.

4. The dual faucet structure as claimed in claim 3, wherein the core pipe has a curved wall.

\* \* \* \* \*